United States Patent [19]
Yang

[11] Patent Number: 5,986,881
[45] Date of Patent: Nov. 16, 1999

[54] DISK DRIVER CAGE ASSEMBLY WITH LOCKING DEVICE

[75] Inventor: Andy K. Yang, Hayward, Calif.

[73] Assignee: Hon Hai Precision Ind. Co., Ltd., Taipei, Taiwan

[21] Appl. No.: 08/972,122

[22] Filed: Nov. 17, 1997

[51] Int. Cl.$^6$ .................................................. G06F 1/16
[52] U.S. Cl. ........................................ 361/685; 361/726
[58] Field of Search ................................... 361/685, 724, 361/725, 726, 727, 683, 732, 740, 747, 759, 801; 312/223.1, 223.2, 333; 364/708.1, 684, 686; 211/41.17; 292/128, 228, 103, 204

[56] References Cited

U.S. PATENT DOCUMENTS

| | | | |
|---|---|---|---|
| 3,767,974 | 10/1973 | Donovan, Jr. et al. | 317/101 DH |
| 4,678,214 | 7/1987 | Cohn et al. | 292/213 |
| 5,142,447 | 8/1992 | Cooke et al. | 361/394 |
| 5,324,204 | 6/1994 | Lwee | 439/64 |
| 5,340,340 | 8/1994 | Hasting et al. | 439/64 |
| 5,593,219 | 1/1997 | Ho | 312/263 |
| 5,673,171 | 9/1997 | Varghese et al. | 361/685 |
| 5,808,871 | 9/1998 | Rosecan et al. | 361/730 |

Primary Examiner—Lynn D. Feild
Assistant Examiner—Jagdish Patel

[57] ABSTRACT

A disk driver cage assembly for receiving a plurality of different disk drivers, includes a disk driver cage and a front rack wherein the disk driver cage is defined with a plurality of bays for receiving the corresponding disk drivers therein, each which have at least a guiding rail and a stop portion. The front rack retained with the disk driver cage includes an opening and a plurality of holes corresponding to the bays. A conductive bay cover is retained with the disk driver cage to cover a corresponding bay which is available, for preventing EMI and ESD. A lock is rotatably attached on the front rack and close to one corresponding bay of the disk driver cage, includes a main body, an operation portion for providing users with manual operation, a latching portion for latching with the inserted disk driver and a pivotal portion for providing the lock with a rotatable movement. Therefore, when the lock is rotated to a vertical latching position, the disk driver received within the corresponding bay can be oriented and retained in an accurate position by means of cooperation between the latching portion and the stop portion, and when the lock is reversed to a horizontal releasing position, the disk driver received within the corresponding bay can be released for being drawn.

8 Claims, 6 Drawing Sheets

DISK DRIVER CAGE ASSEMBLY WITH LOCKING DEVICE

BACKGROUND OF THE INVENTION

1. Field of the Invention

The present invention relates to a disk driver cage assembly for receiving a variety of computer disk drivers, and particularly to a disk driver cage assembly with a releasable/locking means for releasably and securely orienting the rail-mounted disk drivers stalled in the disk driver cage assembly.

2. The Prior Art

Computer disk driver cage is generally defined with a plurality of bays for receiving different type disk drivers, e.g. a 3.5" float disk driver and/or a CD-ROM disk driver, each which is designed with two opposed and spaced guiding rails on opposite lateral walls thereof. The guiding rails of each bay are capable of respectively cooperating with two plastic rail strips disposed by screws on two opposite sides of a corresponding disk driver to guide the disk driver to enter the bay of the disk driver cage. Then the inserted disk driver is further efficiently retained within the bay by the other screws for avoiding undesirable vibration. However, the use of screws for retaining/releasing the disk driver is inconvenient and wastes time. Based on the problem, a number of disk driver cage manufacturers design some additional mechanisms to be disposed with the disk driver cages and/or disk drivers to provide manual operation with convenience. Unfortunately, the structure of the additional mechanisms are too complicated and only appropriate for designated rail strips positioned on the disk drivers and/or designated guiding rails positioned on disk driver cages, rather than the common rail strips or guiding rails. Another type additional mechanisms based on the same reason, though, are assembled with the common disk driver cages, they only comply with specific size disk drivers. However, for accommodating different size disk drivers, it is still inconvenient that the additional mechanisms must be dismantled in advance for avoiding interference with the different size disk drivers. The other type, snap-in locking mechanism, must be manually compressed without interruption until the disk driver is fully inserted/released, and thus it is inconvenient either. Additionally, the foregoing disk driver cage assembly mostly lack accurate orientation function and complemental retention function with regard to the inserted disk drivers for the convenience that the screws are able to be accurately threaded between the disk driver and disk driver cage to achieve a sufficient retentive therebetween. The foregoing disk driver assembly disclosed in U.S. Pat. Nos. 5,067,041, 5,098,175, 5,100,215, 5,112,119, 5,142,447, 5,227,954, 5,262,923, 5,319,519, 5,332,306, 5,488,538, 5,510,955, 5,557,499 and 5,563,767.

Accordingly, for resolving the above disadvantages, an object of the present invention is to provide a disk driver cage assembly with a locking means in comply with the common rail strips disposed on generic disk drivers, which does not interfere at all some adjacent components positioned in the disk driver cage/disk driver for providing users with convenience of assembly of the disk driver.

Another object of the present invention is to provide a disk driver cage assembly with a locking means capable of movably staying in a latching/releasing position with the disk driver for providing users with the convenience of manual operation.

Another object of the present invention is to provide a disk driver cage assembly with a stop portion cooperating with the locking means to provide the inserted disk driver with orientation and retention function.

Another object of the present invention is to provide a disk driver cage assembly with a bay cover cooperating with the locking means for isolating an available bay in the disk driver cage from the environment to prevent electromagnetic interference (EMI) and electrostatic discharge (ESD).

SUMMARY OF THE INVENTION

According to an aspect of the invention, a disk driver cage assembly for receiving a variety of different disk drivers, includes a disk driver cage and a front rack wherein the disk driver cage is defined with a plurality of bays for receiving the corresponding disk drivers therein, each which have at least a guiding rail and a stop portion. The front rack retained with the disk driver cage includes an opening and a plurality of holes corresponding to the bays. A conductive bay cover with a pair of opposed spring arms is retained with the disk driver cage to cover one corresponding bay which is available for preventing electromagnetic interference (EMI) and electrostatic discharge (ESD). A locking means is rotatably attached on the front rack and close to one corresponding bay of the disk driver cage, includes a main body, an operation portion for providing users with manual operation, a latching portion for latching with the inserted disk driver and a pivotal portion for providing the locking means with a rotatable movement. Therefore, when the locking means is rotated to a vertical latching position, the disk driver/bay cover received within the corresponding bay can be oriented and retained in an accurate position by means of cooperation between the latching portion and the stop portion, and when the locking means is reversed to a horizontal releasing position, the disk driver/bay cover received within the corresponding bay can be released for being drawn.

DETAILED DESCRIPTION OF THE PREFERRED EMBODIMENTS

Figure 1:
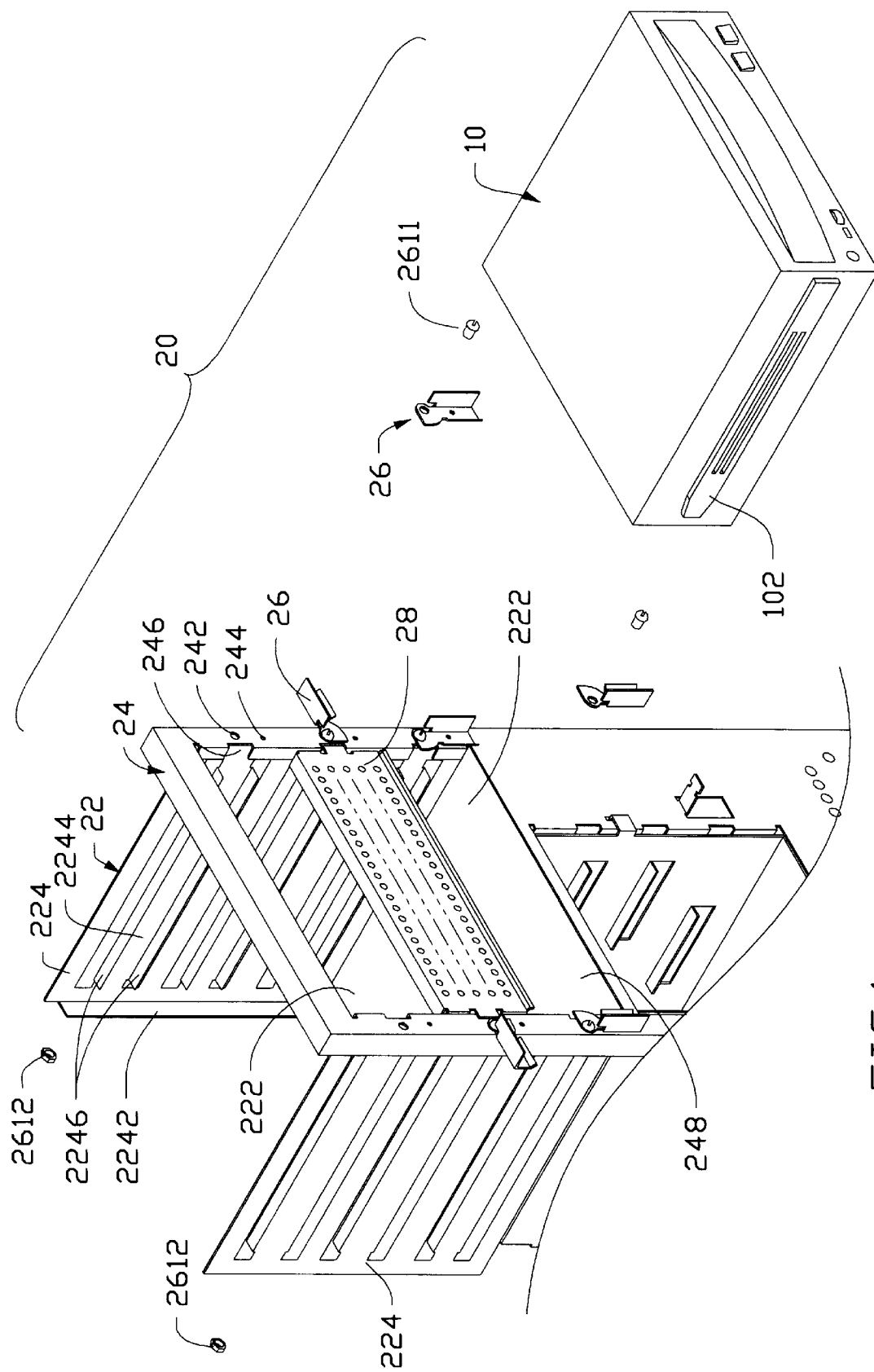
FIG. 1 is an exploded perspective view of a disk driver cage assembly in accordance with the present invention.

References will now be made in detail to the preferred embodiment of the present invention. As shown in FIG. 1, a disk driver cage assembly (20) mainly includes a disk driver cage (22), a front rack (24), a locking means (26) and a bay cover (28).

The U-shaped disk driver cage (22) fabricated from a metal sheet includes two opposed and spaced lateral walls (224) and a plurality of bays (222) defined between the lateral walls (224) wherein each lateral wall (224) further forms a bended stop potion (2242) along a rear edge thereof. Each bay (222) is capable of receiving a corresponding disk driver therein, e.g. a CD-ROM disk driver (10) shown in FIG. 1, and is arranged with a pair of opposed guiding rails (2244) respectively formed with the opposed lateral walls (224) wherein each guiding rail (2244) is defined with two top-to-bottom bended strips (2246) which stamped from one same lateral wall (224) in opposite directions. On the lateral wall (224), an aperture is formed adjacent to a front end of each guiding rail, of which view is covered by the front rack (24) in all drawings.

Figure 4:
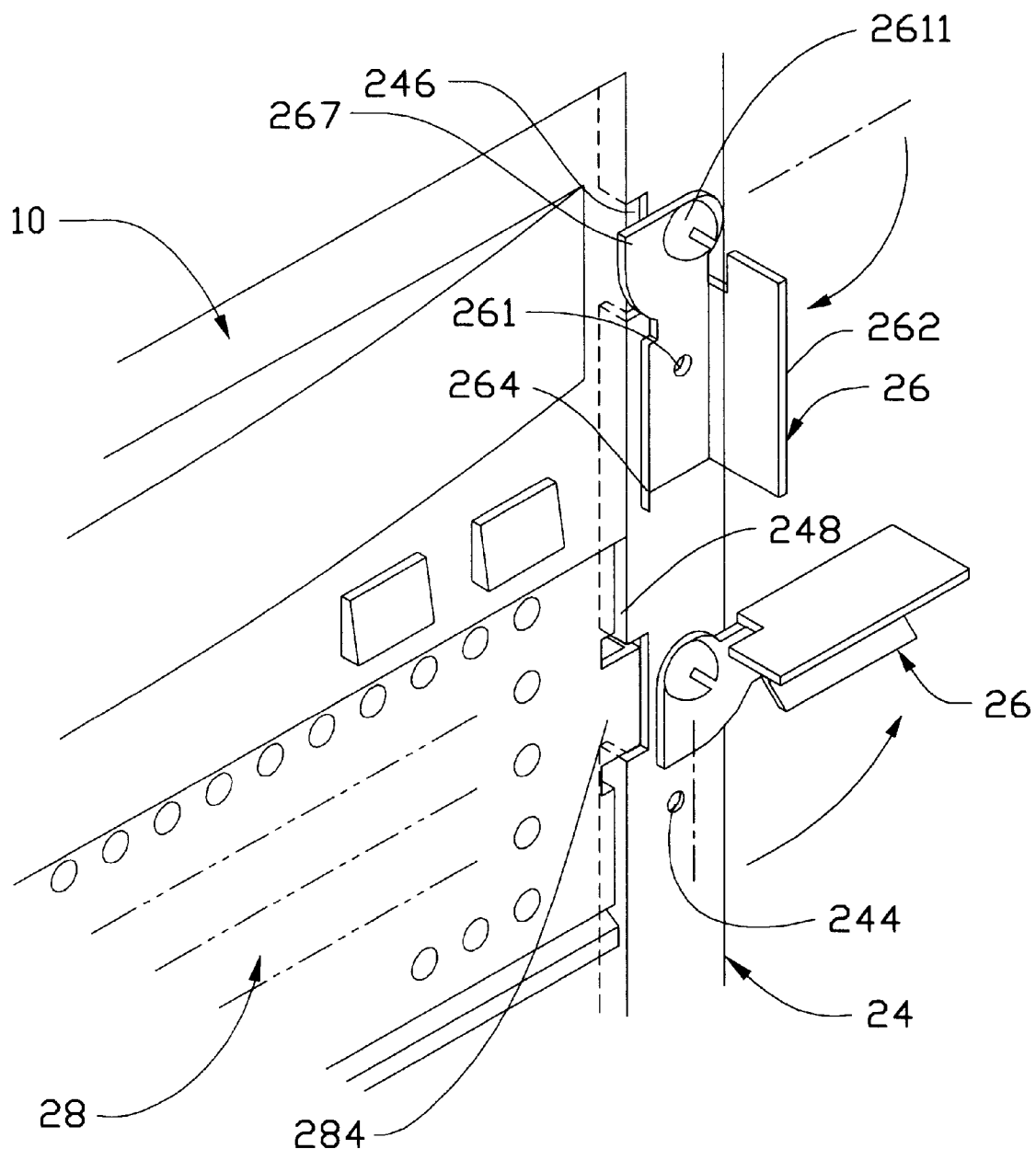
FIG. 4 is a partially enlarged perspective view of the disk driver cage assembly in accordance with a circle A of FIG. 3 showing how the locking means work.

The conductive front rack (24) as shown in FIGS. 1 & 4 is assembled with a front portion (not shown) of the disk driver cage (22), and includes a opening (248) therethrough of which each lateral border (not labeled) in response to each bay (222) of the disk driver cage (22), forms thereon a through hole (242), a cavity (244) and a notch (246) wherein each notch (246) communicating with the opening (248) is aligned with one guiding rail (2244) of the corresponding bay (222).

Figure 5B:
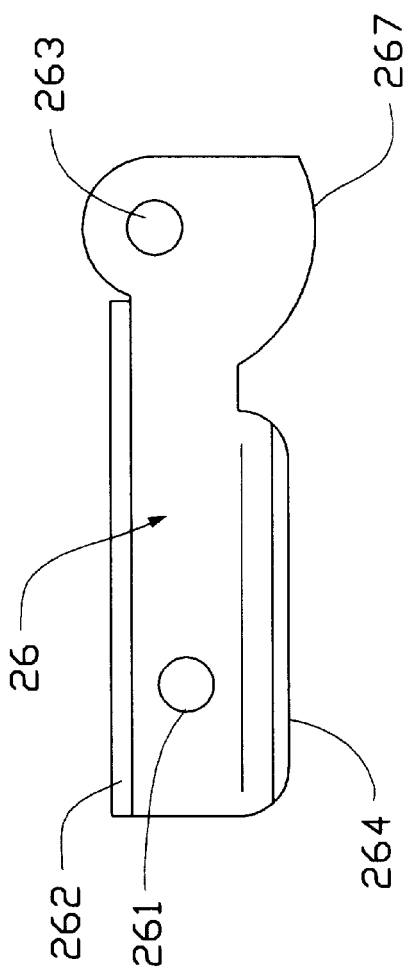
FIGS. 5A–5C are the front, top and left views of a locking means of the disk driver cage assembly in accordance with the present invention.
Figure 5A:
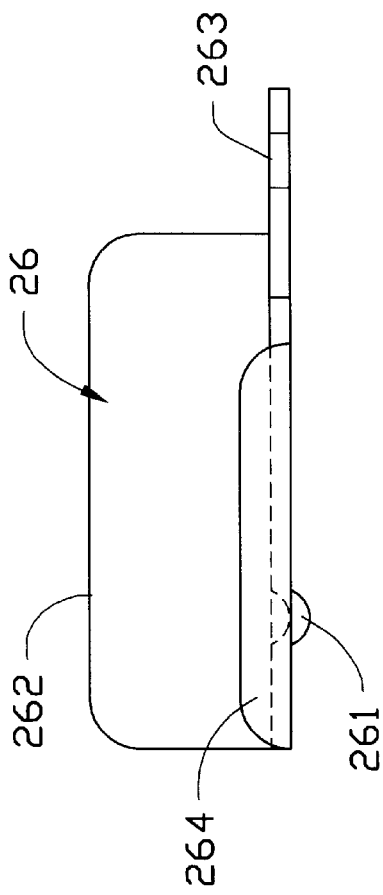
Figure 5C:
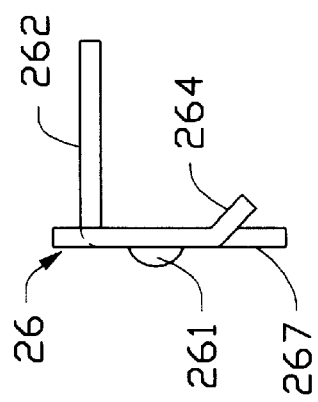

A locking means (26) includes a planar main body (265) as shown in FIGS. 5(A)–5(C) wherein an operation portion (262) perpendicularly extends upward from an edge of the planar main body (265), and a guiding portion (264) slantingly extends upward from opposite edge of the main body (265), and a hole-shaped pivotal portion (263) is located on an end of the main body (265). A dimple-like holding portion (261) is further formed between the guiding portion (264) and operation portion (262). An arc latching portion (267) is close to the pivotal portion (263).

Figure 3:
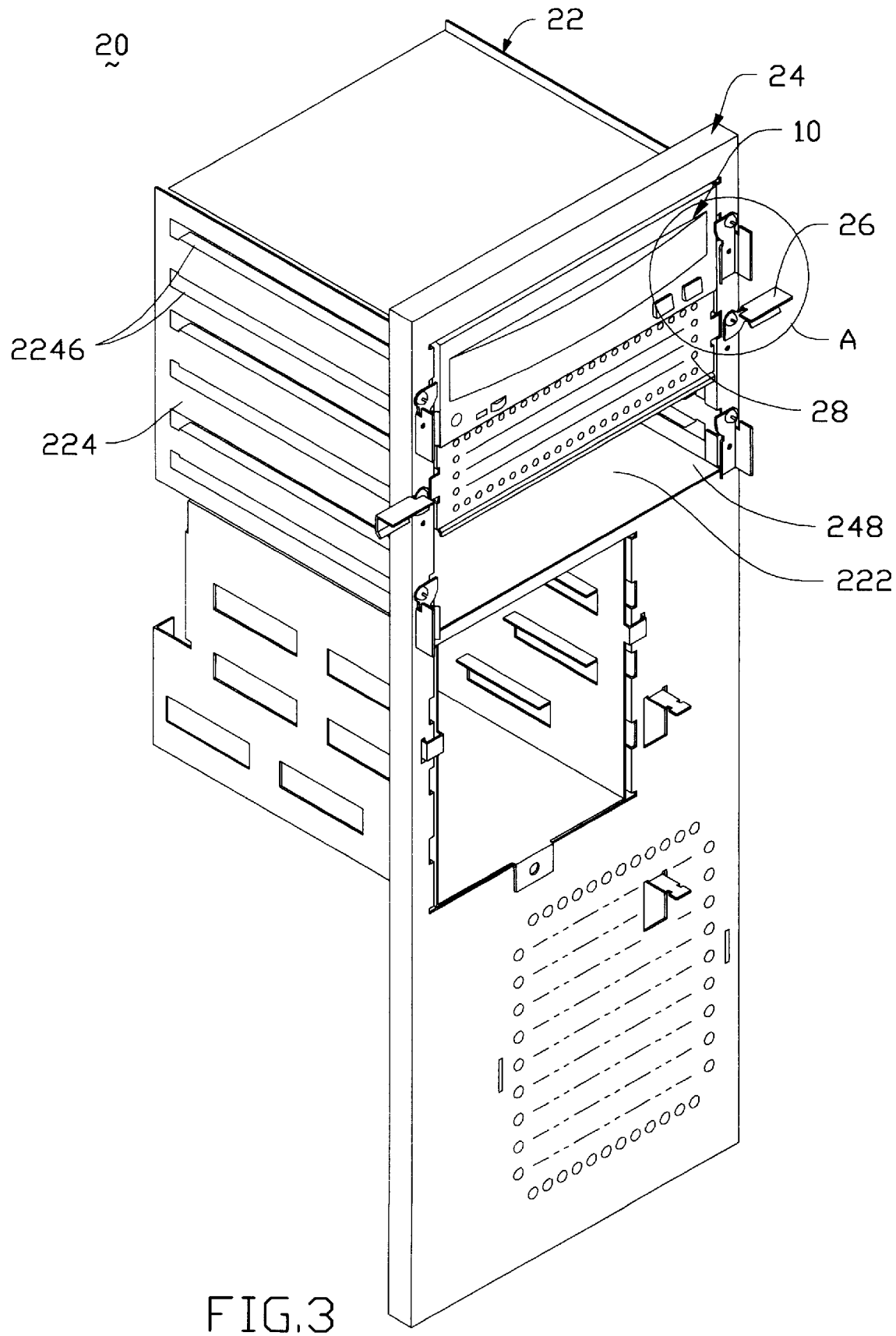
FIG. 3 is a perspective view of the disk driver assembly in accordance with the present invention showing the assembled disk driver cage assembly.

In assembly as shown in FIGS. 1, 3 & 4, each locking means (26) is rotatablely attached on the front rack (24) by means that a screw (2611) is threaded through the hole (242) and the pivotal portion (263) to cooperate with a nut (2612), in response to each associated notch (246) of the front rack (24). A disk driver (10) with two opposite plastic rail strips (102) is inserted into the corresponding bay (222) of the disk driver cage (22) from the opening (248) of the front rack (24) by means that each rail strip (102), through the notch (246), slides on the corresponding guiding rail (2244) until a rear end of the disk driver (10) is obstructed by the stop portion (2242).

As the result shown in FIG. 4, the operation portion (262) of the locking means (26) is able to be rotated by manual operation upon the pivotal portion (263). When the locking means (26) smoothly reaches a vertical latching position by means of inclined guidance of the guiding portion (264) thereof, the dimple-like holding portion thereof is snapped within the cavity (244) of the disk driver cage (22) to keep the latching position. At the time, the arc latching portion (267) of the locking means (26) is located adjacent to a front surface of the notch (246) of the front rack (24) to prevent the rail strips of the disk driver (10) received within the bay (222) from moving frontward. Oppositely, when the locking means (26) is manually reversed to a horizontal releasing position which is still kept by the miniature retention of the screw (2611), the arc latching portion (267) can leave the notch (246) to permit that the disk driver (10) is further manually drawn from the corresponding bay (222) of the disk driver cage (22).

It is noted that the disk driver cage assembly (20) in accordance with the present invention is capable of complying with the common rail strips disposed on generic disk drivers and does not interfere at all the other adjacent components (not shown) positioned in the disk driver cage assembly (20) or the disk driver (10) for providing users with the convenience of assembly of the disk driver (10). The locking means (26) is capable of movably keeping a latching/releasing position with respect to the disk driver (10) for providing users with the convenience of manual operation. Additionally, by means of cooperation of the stop portion (2242) and locking means (26), the inserted disk driver (10) can be oriented and retained in an accurate position convenient to thread the other screws (not shown) to the other portion thereof for more efficient retention with the disk driver cage assembly (20). In fact, according to the present invention, the use of the other screws are not absolutely necessary.

Figure 2:
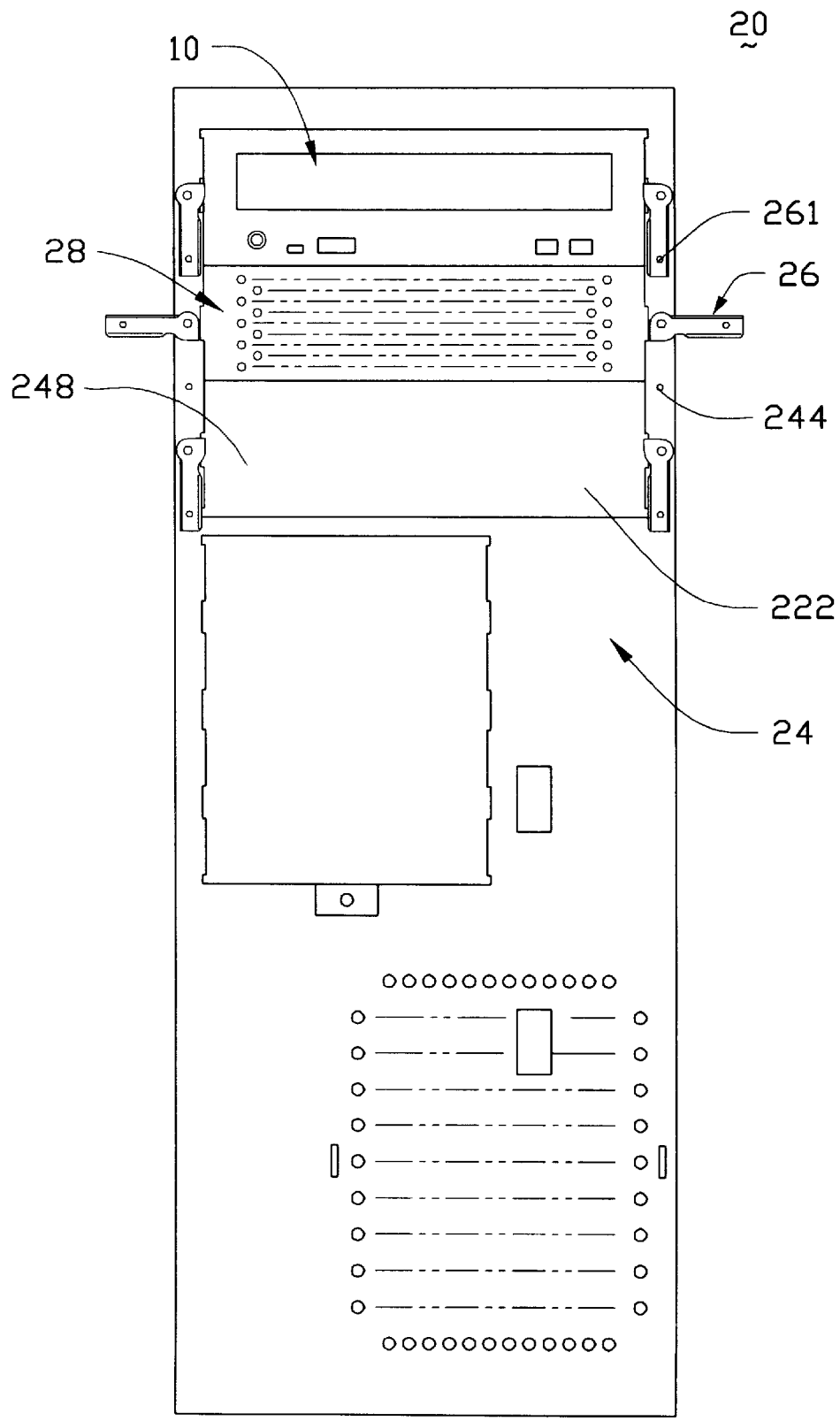
FIG. 2 is a front view of the disk driver cage assembly in accordance with the present invention showing an assembled disk driver cage assembly.
Figure 6:
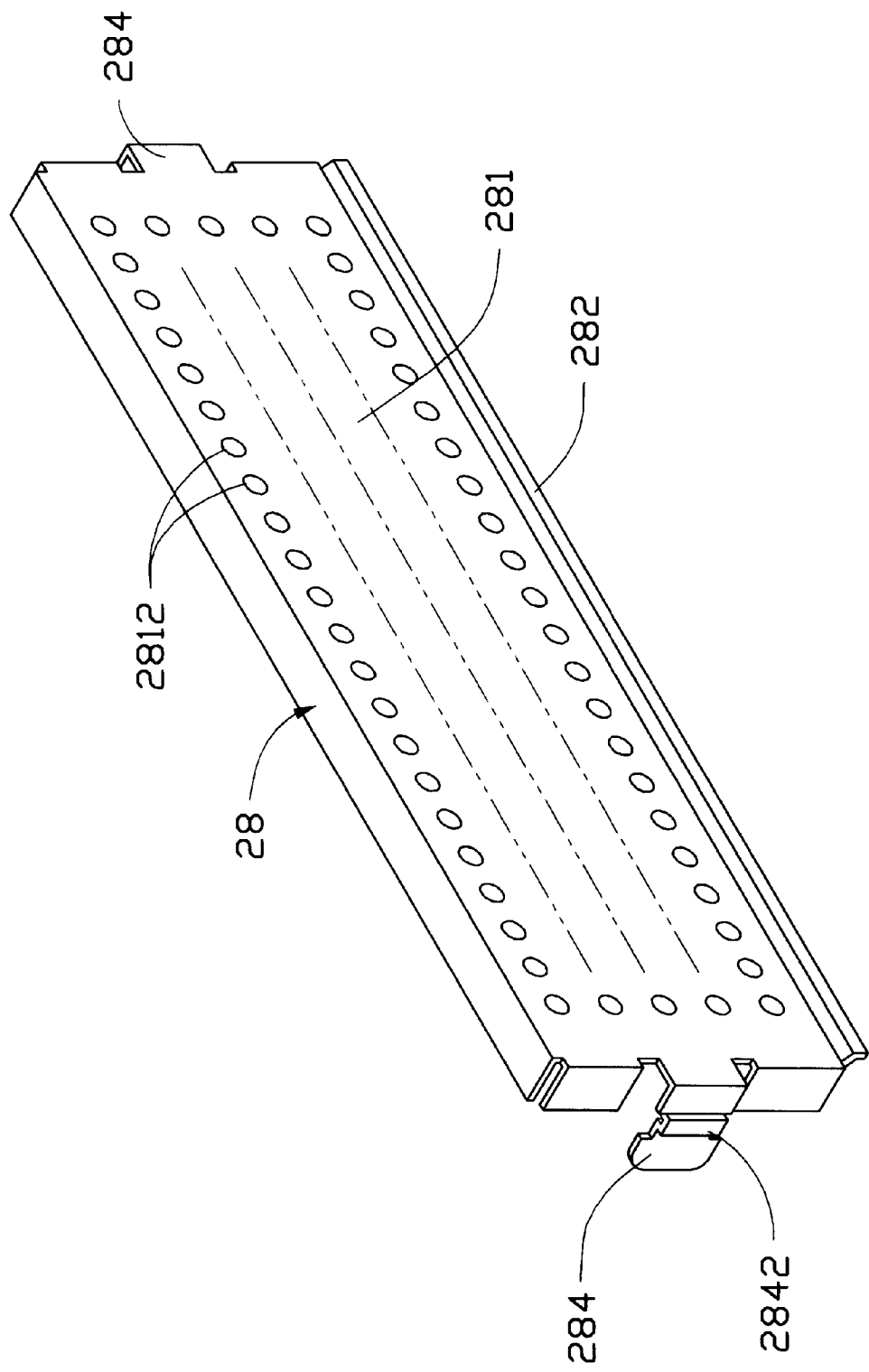
FIG. 6 is an enlarged perspective view of a bay cover of the disk driver cage assembly in accordance with the present invention.

The conductive bay cover (28) is capable of isolating each available bay (222) of the disk driver (22) from the environment to resist electromagnetic interference (EMI) and electrostatic discharge (ESD) as shown in FIGS. 1–3. The elongated bay cover (28) shown in FIG. 6 includes a planar portion (281) with a plurality of specific size vent holes (2812) therethrough which is capable of dissipating heat. A pair of spring arms (284) are integrally formed respectively with two opposed lateral edges of the planar portion (281) to extend rearward and each have a protrusion (2842) by bending. An extension portion (282) extends downward from a bottom edge of the planar portion (281) for electrical engagement with another bay cover (not shown) installed below the bay cover (222). In assembly shown in FIG. 4, the bay cover (28) is retained on the disk driver cage (22) for covering one corresponding bay (222) by means that the protrusion portion (2842) of each spring arm (284) of the bay cover (28) is snapped in the corresponding aperture in each lateral wall (224) of the disk driver cage (22) located between the guiding rail (2244) of the disk driver cage (22) and the notch (246) of the front rack (24). For ensuring the result, the locking means (26) attached adjacent to the corresponding bay cover (28) can be also manually rotated to the vertical latching position/the horizontal releasing position to latch/release with regard to the inserted bay cover (28).

While the present invention has been described with reference to specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

Therefore, person of ordinary skill in this field are to understand that all such equivalent structures are to be included within the scope of the following claims.

I claim:

1. A disk driver cage assembly for receiving a plurality of different disk drivers therein, comprising:

a disk driver cage defined with a plurality of bays for receiving the corresponding disk drivers therein, each which have at least a guiding rail and a stop portion located adjacent to a rear end of the guiding rail;

a front rack retained with disk driver cage, having an opening defined on an outermost surface thereof to provide the disk drivers with entrances, and a plurality of holes corresponding to the bays, each extending through the outermost surface of the front rack; and at least a locking means retentively located beyond the front rack in response to one corresponding bay of the disk driver cage, and having a planar main body, an operation portion extending outward form an edge of the main body for providing users with manual operation, a latching portion extending from another edge of the main body for latching with the inserted disk driver, and a pivotal portion pivotally secured within the corresponding hole of the front rack thereby providing the locking means with a rotatable movement based on the hole wherein when the locking means is rotated to a first position, the disk driver received within the corresponding bay is oriented and retained in an accurate position by means of cooperation between the latching portion of the locking means and the stop portion of the disk driver cage, and when the locking means is rotated to a second position substantially parallel to said outermost surface of the front rack, the disk driver received within the corresponding bay is released for being drawn.

2. The disk driver cage assembly as described in claim 1, wherein the disk driver cage further includes two opposed and spaced lateral walls.

3. The disk driver cage assembly as described in claim 2, wherein the guiding rail and the stop portion are integrally formed on each lateral wall.

4. The disk driver cage assembly as described in claim 1, wherein the front rack further includes at least a cavity in response to one corresponding bay.

5. The disk driver cage assembly as described in claim 4, wherein the locking means further includes a holding portion for retentive cooperation with said cavity of the front rack to keep the first position of the locking means.

6. The disk driver cage assembly as described in claim 1, wherein the disk driver is disposed with two rail strips.

7. The disk driver cage assembly as described in claim 6, wherein the front rack further includes at least a notch in alignment with one corresponding guiding rail of the disk driver cage for providing the rail strips of the disk driver with entrances.

8. The disk driver cage assembly as described in claim 7, wherein when the locking means is located in the first position, the latching portion is located beyond the notch of the front rack.

\* \* \* \* \*